United States Patent [19]

Nakajima et al.

[11] Patent Number: 4,539,967

[45] Date of Patent: Sep. 10, 1985

[54] DUTY RATIO CONTROL METHOD FOR SOLENOID CONTROL VALVE MEANS

[75] Inventors: Toyohei Nakajima; Kiyohisa Tomono, both of Shiki, Japan

[73] Assignee: Honda Giken Kogyo K.K., Tokyo, Japan

[21] Appl. No.: 624,102

[22] Filed: Jun. 25, 1984

[30] Foreign Application Priority Data

Jun. 30, 1983 [JP] Japan .................................. 58-118721

[51] Int. Cl.³ ...................... F02D 21/08; F02D 33/00
[52] U.S. Cl. .................................. 123/585; 123/339; 123/438; 123/571; 91/361; 137/2; 137/10; 137/12; 137/486; 137/487.5
[58] Field of Search ................ 123/339, 438, 571, 585; 137/486, 487.5, 2, 10, 12; 91/361, 459

[56] References Cited

U.S. PATENT DOCUMENTS

| | | | |
|---|---|---|---|
| 4,370,960 | 2/1983 | Otsuka | 123/339 |
| 4,409,948 | 10/1983 | Hasegawa et al. | 123/571 |
| 4,425,886 | 1/1984 | Kuroiwa et al. | 123/585 |

FOREIGN PATENT DOCUMENTS 55-93950  7/1980  Japan .................................. 123/571

Primary Examiner—Andrew M. Dolinar
Attorney, Agent, or Firm—Arthur L. Lessler

[57] ABSTRACT

A method of controlling the duty ratio of operation of a solenoid control valve in a fluid passage to control the flow rate of fluid in the fluid passage to a desired value. A flow rate value range is divided into a plurality of flow rate value regions between first and second extreme flow rate values which the fluid can assume when the duty ratio assumes corresponding minimum and maximum values. A first predetermined duty ratio value is preset corresponding to each of the divided regions and dependent upon the magnitude of manufacturing variations of the duty ratio-to-flow characteristic of the valve. A second larger predetermined duty ratio value is preset corresponding to each of the divided regions. The duty ratio is set to the second predetermined value or the first predetermined value corresponding to one of the divided regions within which the desired flow rate value falls, when the detected flow rate value is on the side of the first extreme flow rate value or on the side of the second extreme flow rate value adjacent the desired flow rate value, respectively.

16 Claims, 14 Drawing Figures

4,539,967

DUTY RATIO CONTROL METHOD FOR SOLENOID CONTROL VALVE MEANS

BACKGROUND OF THE INVENTION

This invention relates to a duty ratio control method for controlling a duty ratio with which a solenoid valve means is to be driven, and more particularly to a method of this kind which is adapted to perform control of a solenoid valve means so as to control the flow rate of a fluid to be regulated by the solenoid valve means to a desired value in a prompt and accurate manner.

A control method is widely known which controls the flow rate of a fluid flowing in a fluid passage by means of on-off control of a solenoid valve arranged in the fluid passage.

In such control method, in order to control the flow rate of fluid to a desired or target value promptly upon setting of the same value as a new value, without overshooting or hunting of the flow rate of fluid, it is necessary to set the duty ratio with which the solenoid valve is to be operated, in accordance with the desired flow rate value and the difference between the actual flow rate value and the desired flow rate value. The duty ratio setting requires previously determining with accuracy the flow rate characteristic of the fluid flowing through the fluid passage relative to the duty ratio of the solenoid valve. However, this requires a great deal of time and labor if the solenoid valve is produced on a mass production basis. That is, there can occur variations in the flow rate characteristic of the fluid between the individual solenoid valves, attributable to machining tolerances of component parts including the solenoid valve and the fluid passage, fitting and assembling tolerances thereof, aging changes in the performance thereof, etc., making it difficult to determine with accuracy the flow rate characteristics of individual solenoid valves and also to perform such determination periodically or each time a predetermined period of use lapses. If to avoid these difficulties, the duty ratio for the solenoid valve is set in accordance with an average flow rate characteristic of the solenoid valve, it is impossible or takes much time to control the flow rate of fluid to a desired or target value with accuracy in the case of a solenoid valve having a different flow rate characteristic from the average one, even causing overshooting or hunting of the flow rate of fluid.

SUMMARY OF THE INVENTION

It is the object of the invention to provide a duty ratio control method for solenoid control valve means, which is capable of achieving the flow rate of fluid to a desired value in a prompt and accurate manner by the use of any solenoid control valves, even with variations in flow rate characteristic between individual ones of the solenoid control valve means.

The present invention provides a method of controlling a duty ratio with which solenoid control valve means arranged in a fluid passage is to be driven, to thereby control the flow rate of fluid flowing in the fluid passage to a desired value. The method according to the invention is characterized by comprising the following steps:

(1) dividing into a plurality of flow rate value regions a range of flow rate values between a first extreme flow rate value and a second extreme flow rate value which can be assumed by the fluid, respectively, when the duty ratio for the solenoid control valve means produced in each lot assumes a predetermined miminum value and a predetermined maximum value;

(2) setting beforehand a first predetermined value of duty ratio corresponding to each of the divided flow rate regions of the step (1), and a second predetermined value of duty ratio corresponding to each of the divided flow rate regions and larger than the first predetermined value of duty ratio, the first and second predetermined values of duty ratio being dependent upon the magnitude of variations of duty ratio-to-flow rate characteristic of the solenoid control valve means in each lot;

(3) detecting an actual value of the flow rate of the fluid;

(4) setting the duty ratio for the solenoid control valve means to the above second predetermined value corresponding to one of the divided flow rate regions to which the desired flow rate value pertains, when the actual value of the flow rate of the fluid detected in the step (3) is on the side of the first extreme flow rate value with respect to the desired flow rate value;

(5) driving the solenoid control valve means with the duty ratio set in the step (4);

(6) setting the duty ratio for the solenoid control valve means to the above first predetermined value corresponding to one of the divided flow rate regions to which the desired flow rate value pertains, when the actual value of the flow rate of the fluid detected in the step (3) is on the side of the second extreme flow rate value with respect to the desired flow rate value; and (7) driving the solenoid control valve means with the duty ratio set in the step (6).

Preferably, in the step (4), when the detected actual flow rate value of the fluid is on the side of the first extreme flow rate value with respect to the desired flow rate value and within a first predetermined range from the desired flow rate value at the same time, the duty ratio for the solenoid control valve means is set to the second predetermined value, and in the step (6), when the detected actual flow rate value of the fluid is on the side of the second extreme flow rate value with respect to the desired flow rate value and within a second predetermined range from the desired flow rate value at the same time, the duty ratio for the solenoid control valve means is set to the first predetermined value.

Also, preferably, in the step (4), when the detected actual flow rate value of the fluid is on the side of the first extreme flow rate value with respect to the desired flow rate value and outside the above first predetermined range from the desired flow rate value at the same time, the duty ratio for the solenoid control valve means is set to the aforementioned predetermined maximum value, and in the step (6), when the detected actual flow rate value of the fluid is on the side of the second extreme flow rate value with respect to the desired flow rate value and outside the above second predetermined range from the desired flow rate value at the same time, the duty ratio for the solenoid control valve means is set to the aforementioned predetermined minimum value.

Preferably, the predetermined maximum value of duty ratio is set to 100 percent, and the predetermined minimum value of duty ratio to 0 percent, respectively.

Also preferably, the aforementioned fluid passage is connected at one end to an intake passage of an internal combustion engine at a location downstream of a throttle valve arranged in the intake passage, and communicates at the other end with the atmosphere, wherein the fluid comprises air.

Further, preferably, the method according to the invention is applied to a control system for controlling a control valve for regulating the flow rate of a fluid being supplied to an internal combustion engine. The control system includes a first hydraulic pressure source for supplying a first fluid, a second hydraulic pressure source for supplying a second fluid, a pressure responsive element connected to the above control valve and displaceable by a synthetic operating hydraulic pressure determined by the ratio in flow rate between the first fluid from the first hydraulic pressure source and the second fluid from the second hydraulic pressure source, a first operating fluid passage for guiding the first fluid to the pressure responsive element, and a second operating fluid passage for guiding the second fluid to the same pressure responsive element, wherein the solenoid control valve means is arranged in one of the first and second operating fluid passages.

Alternatively, the control system may include a first hydraulic pressure source for supplying a first fluid, a second hydraulic pressure source for supplying a second fluid, a pressure responsive element connected to the above control valve and displaceable by a synthetic operating hydraulic pressure determined by the ratio in flow rate between the first fluid from the first hydraulic pressure source and the second fluid from the second hydraulic pressure source, a first operating fluid passage communicating the pressure responsive element with the first hydraulic pressure source, and a second operating fluid passage branching off from an intermediate portion of the first operating fluid passage and communicating with the second hydraulic pressure source, wherein the solenoid control valve means is arranged in the junction of the second operating fluid passage with the first operating fluid passage. The solenoid control valve comprises a three-way solenoid valve adapted to selectively allow the first fluid and the second fluid to be applied to the pressure responsive element.

Preferably, the first fluid from the first hydraulic pressure source is intake air in an intake pipe of an internal combustion engine as intake passage pressure, and the second fluid from the second hydraulic pressure source is atmospheric air as atmospheric pressure.

The detection of the actual flow rate value of the fluid may be effected by detecting an amount of displacement of the pressure responsive element, and the desired flow rate value may be expressed in terms of a desired amount of displacement of the pressure responsive element.

The aforementioned control valve may include a control valve for controlling at least one of the amount of intake air, the amount of fuel, and the amount of recirculated exhaust gases, which are being supplied to the engine.

The above and other objects, features, and advantages of the invention will be more apparent from the ensuing detailed description taken in conjunction with the accompanying drawings.

DETAILED DESCRIPTION

The method according to the invention will now be described in detail.

Figure 1:
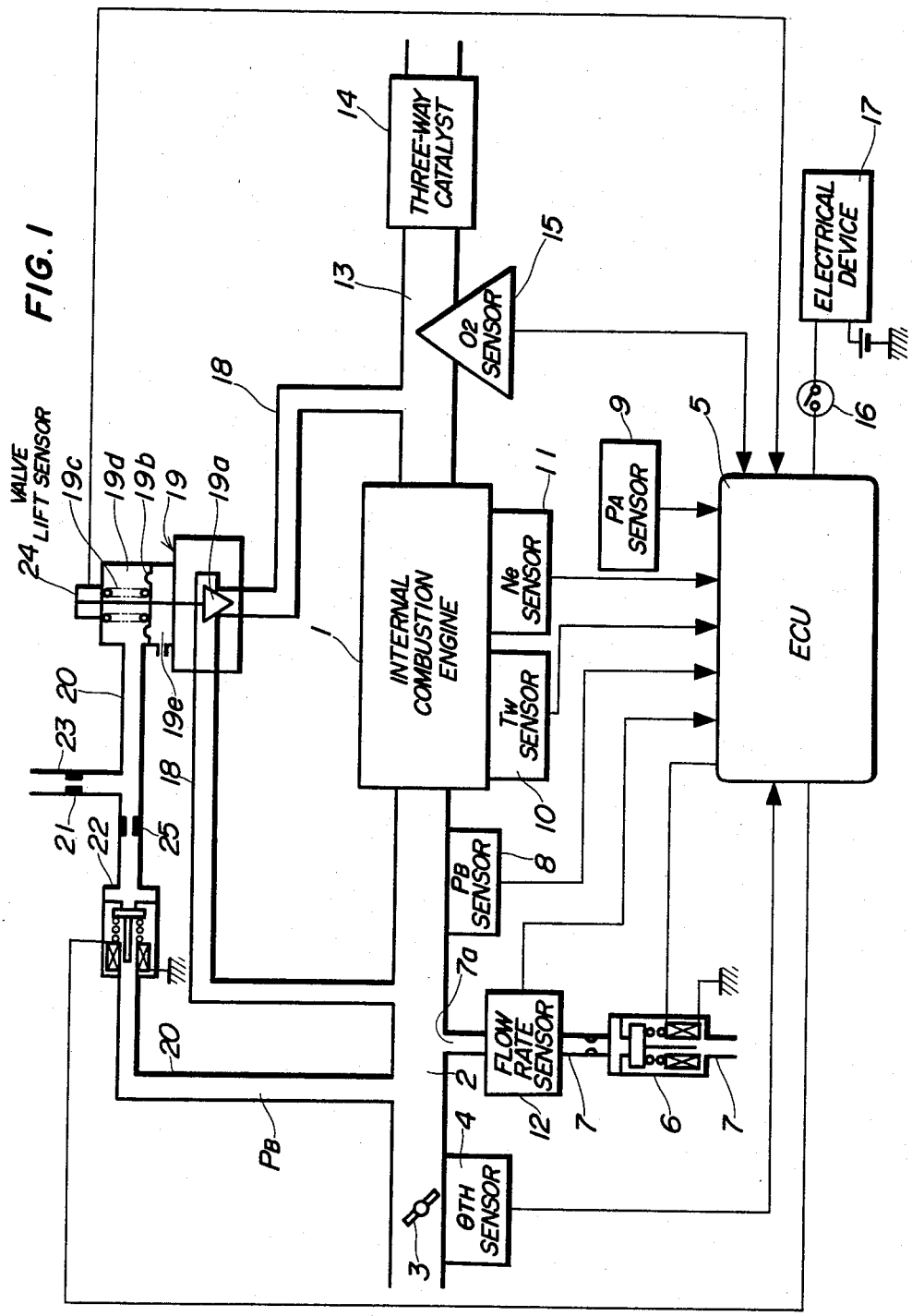
FIG. 1 is a block diagram illustrating the whole arrangement of an internal combustion engine which is equipped with an intake air quantity-increasing device as well as with an exhaust gas recirculation system, to which is applied the method according to the invention as first and second embodiments thereof, respectively.

Referring first to FIG. 1, there are illustrated an internal combustion engine, and an intake air quantity-increasing device and an exhaust gas recirculation control system therefor, wherein the former is provided as a first embodiment of the method according to the invention, and the latter as a second embodiment thereof, respectively.

Reference is first made to the intake air quantity-increasing device according to the first embodiment. The device is intended to supply the engine with supplementary air in quantities responsive to loaded conditions of headlamps, a heater, an air conditioner equipped in the engine, etc. during idling operation of the engine, so as to prevent a drop in the idling speed of the engine. In FIG. 1, reference numeral 1 designates an internal combustion engine which may be a four-cylinder type, for instance. An intake pipe 2 is connected to the engine 1, in which is arranged a throttle valve 3, which in turn is coupled to a throttle valve opening ($\theta$th) sensor 4 for detecting its valve opening and converting same into an electrical signal which is supplied to an electronic control unit (hereinafter called "the ECU") 5.

An air passage 7 opens at one end in the intake pipe 2 at a location downstream of the throttle valve 3 and communicates at the other end with the atmosphere, across which is arranged a normally closed type solenoid valve 6 forming part of the intake air quantity-increasing device. The solenoid valve 6 is adapted to open the air passage 7 when energized, to increase the quantity of air being supplied to the engine 1. Arranged in the air passage 7 at a location downstream of the solenoid valve 6 is a flow rate sensor 12 for sensing the flow rate of air flowing through the air passage 7, which supplies an electrical signal indicative of the sensed flow rate of air to the ECU 5. The type of this sensor 12 is limited to a specific one, and may be a hot wire type or a vortex type.

On the other hand, a negative pressure sensor (PB) 8 communicates with the interior of the intake pipe at a location immediately downstream of the throttle valve 3. The negative pressure (PB) sensor 8 is adapted to detect negative pressure in the intake pipe 2 and applies an electrical signal PB indicative of detected intake pipe pressure to the ECU 5.

An engine cooling water temperature (TW) sensor 10, which may be formed of a thermistor or the like, is mounted on the cylinder block of the engine 1 in a manner embedded in the peripheral wall of an engine cylinder having its interior filled with cooling water, an electrical output signal of which is supplied to the ECU 5.

An engine rotational speed (Ne) sensor (hereinafter called "the Ne sensor") 11 is arranged in facing relation to a camshaft, not shown, of the engine 1 or a crankshaft of same, not shown. The Ne sensor 11 is adapted to generate one pulse at one of particular crank angles of the engine each time the engine crankshaft rotates through 180 degrees, i.e. each pulse of a top-dead-center position (TDC) signal. The above pulses generated by the Ne sensor 11 are supplied to the ECU 5.

A three-way catalyst 14 is arranged in an exhaust pipe 13 extending from the cylinder block of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are an atmospheric pressure (PA) sensor 9 for detecting atmospheric pressure, and an electrical device 17 such as headlamps which is connected to the ECU 5 by way of a switch 16, for supplying the ECU 5 with an electrical signal indicative of detected atmospheric pressure, and an electrical signal indicative of on and off positions of the electrical device 17, respectively.

The ECU 5 is responsive to various engine operating parameter signals from the above sensors, i.e. the throttle valve opening sensor 4, the intake pipe negative pressure sensor 8, the atmospheric pressure sensor 9, the engine cooling water temperature sensor 10, the Ne sensor 11, and the $O_2$ sensor 15, as well as a signal indicative of electrical load on the engine 1 from the electrical device 17, to set a desired flow rate value LCMD of supplementary air being supplied to the engine 1 through the aforementioned solenoid valve 6. Then, the ECU 5 operates on the set desired flow rate value LCMD to calculate valve opening duty values DBH and DBL for the solenoid valve 6 in a manner hereinafter described, also calculate the difference l between an actual flow rate value LACT of supplementary air sensed by the flow rate sensor 12 and the desired flow rate value LCMD, and set the valve opening duty ratio value DOUT for the solenoid valve 6 to either the value DBH or the value DBL, depending upon whether the difference l assumes a positive value or a negative value with respect to the desired value LCMD. The ECU 5 supplies the solenoid valve 6 with a driving signal to open same with the valve opening duty ratio DOUT thus set.

If the valve opening duty ratio DOUT is set to a larger value to increase the supplementary air quantity, the total quantity of intake air supplied to the engine 1 will increase so that the engine output increases, resulting in an increase in the engine rotational speed, while if the duty ratio DOUT is set to a smaller value, the total intake air quantity will decrease, resulting in a decrease in the engine rotational speed. In this manner, the engine rotational speed can be controlled by varying the valve opening duty ratio of the solenoid valve 6, i.e. the supplementary air quantity.

Figure 2:
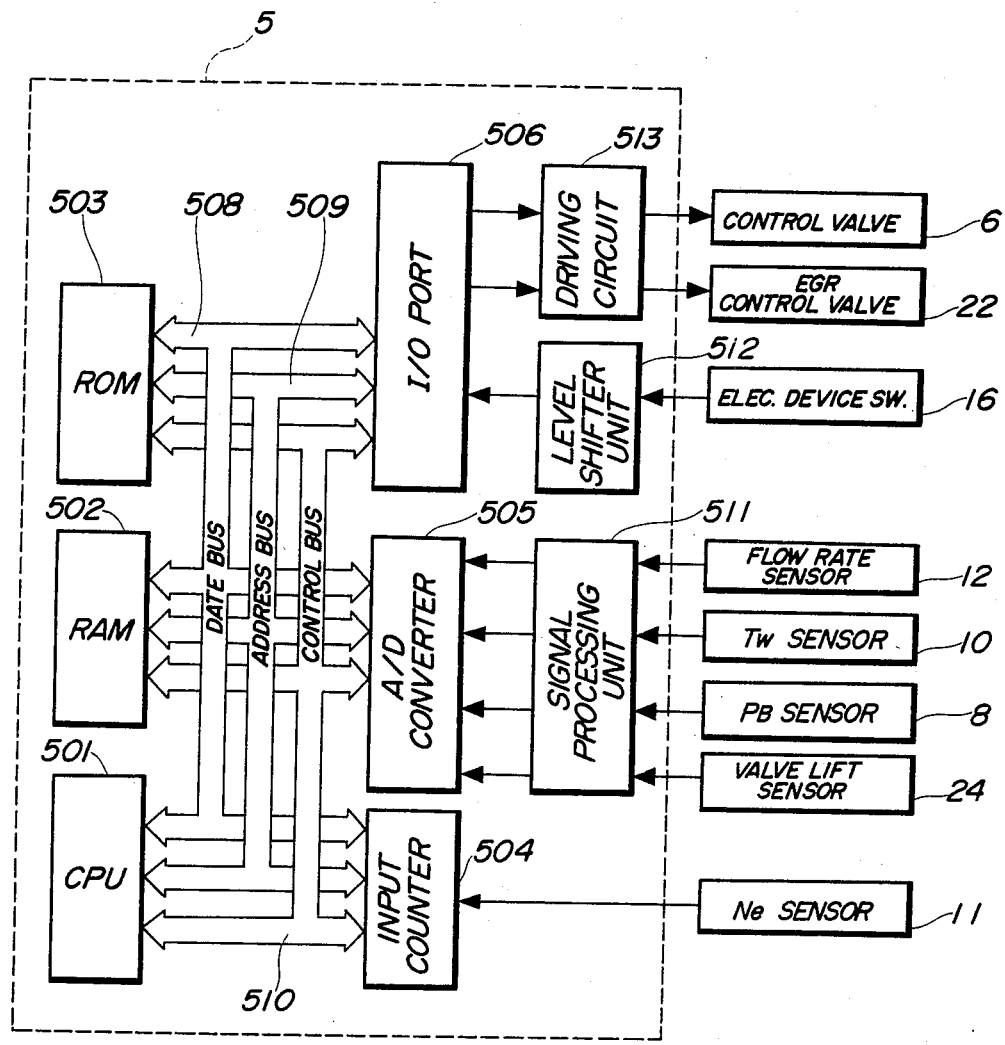
FIG. 2 is a circuit diagram showing the interior construction of an electronic control unit (ECU) appearing in FIG. 1.

FIG. 2 shows in the form of a block diagram the interior construction of the ECU 5 in FIG. 1. A central processing unit (hereinafter called "the CPU") 501 is connected, by way of a data bus 508, an address bus 509 and a control bus 510, to a random access memory (hereinafter called "the RAM") 502 for temporarily storing results of calculations within the CPU 501, etc., a read-only memory (hereinafter called "the ROM") 503 storing a control program for calculating the valve opening duty ratio, etc. to be executed within the CPU 501, an input counter 504, an A/D converter 505, and an I/O port 506, for giving and receiving input data and output data between the CPU 501 and the RAM 502, etc. through the above buses.

The TDC signal from the Ne sensor 11 in FIG. 1 is supplied to the above input counter 504 which is actuated by each pulse of the TDC signal to generate and apply a single pulse to the CPU 501 through the data bus 508 as a TDC-synchronizing signal, and at the same time the input counter 504 counts the time interval Me between adjacent pulses of the TDC signal. The counted value Me, which is proportional to the reciprocal of the engine rpm, is supplied to the CPU 501 through the data bus 508.

Parameter signals from the various sensors such as the intake pipe negative pressure (PB) sensor 8, the engine water temperature sensor (TW) sensor 10, the flow rate sensor 12, etc. a valve lift sensor 24 for an exhaust gas recirculation control system, described later as a second embodiment of the invention, etc. as appearing in FIG. 1, are shifted into a predetermined voltage level by means of a signal processing circuit 511, and then successively applied to the A/D converter 505 to be converted into respective corresponding digital signals. These digital signals are successively supplied to the CPU 501.

An on-off position signal from the electrical device 17 is shifted into a predetermined voltage level by means of a level shifter 512, and then supplied to the CPU 501 through the I/O port 506.

The CPU 501 executes the control program stored in the ROM 503 to calculate the desired flow rate value LCMD of supplementary air to be supplied to the engine through the solenoid valve 6, the valve opening duty ratio values DBH, DBL, the difference 1, etc., calculate the valve opening duty ratio DOUT on the basis of the calculated difference 1, and supplies an on-off control signal corresponding to the calculated value DOUT to a driving circuit 513. The driving circuit 513 supplies the solenoid valve 6 with a driving signal for operating same as long as it is supplied with each pulse of the on-off control signal.

Figure 3:
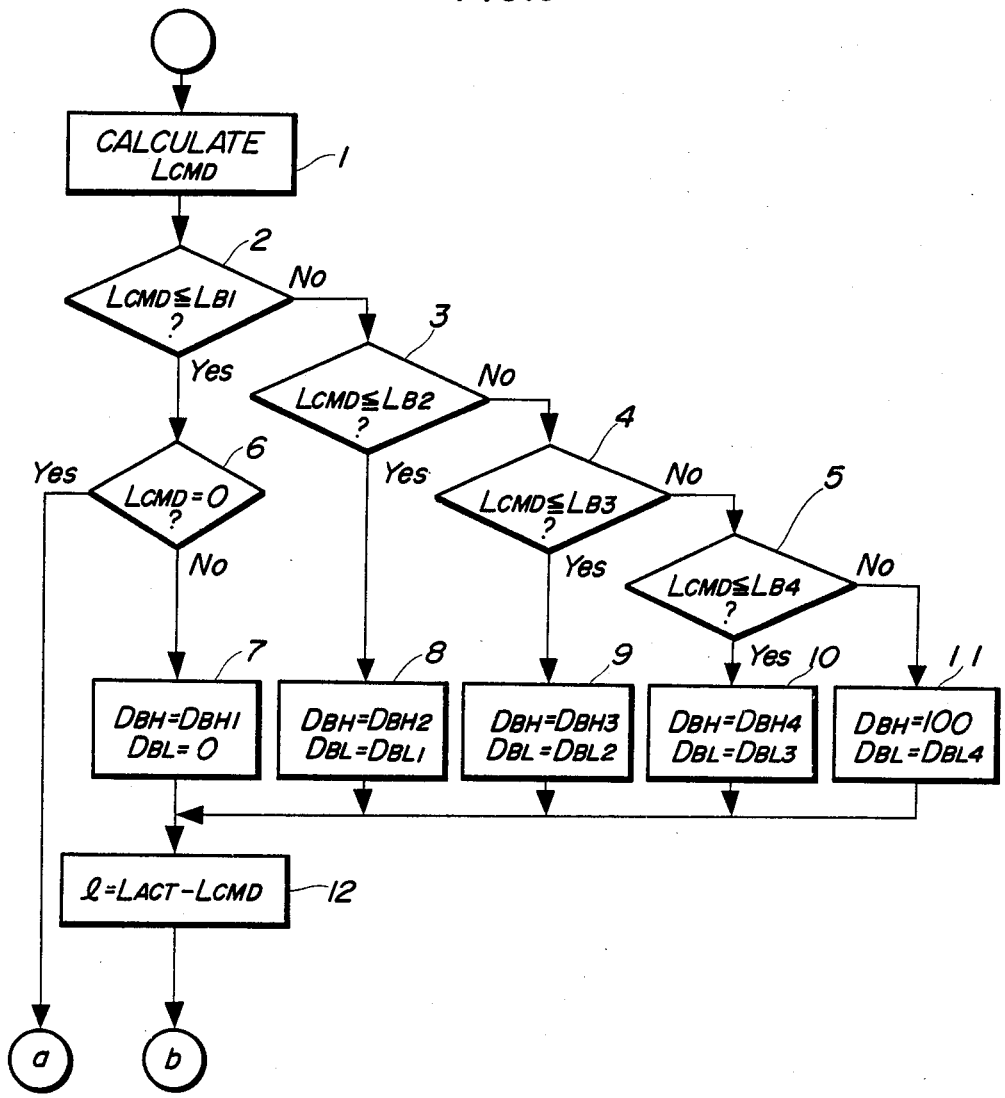
FIG. 3 is a flowchart showing part of a program for setting the duty ratio for solenoid control valve means, executed within the ECU, the shown part being mainly for setting a first predetermined duty ratio DBL and a second predetermined duty ratio DBH.
Figure 4:
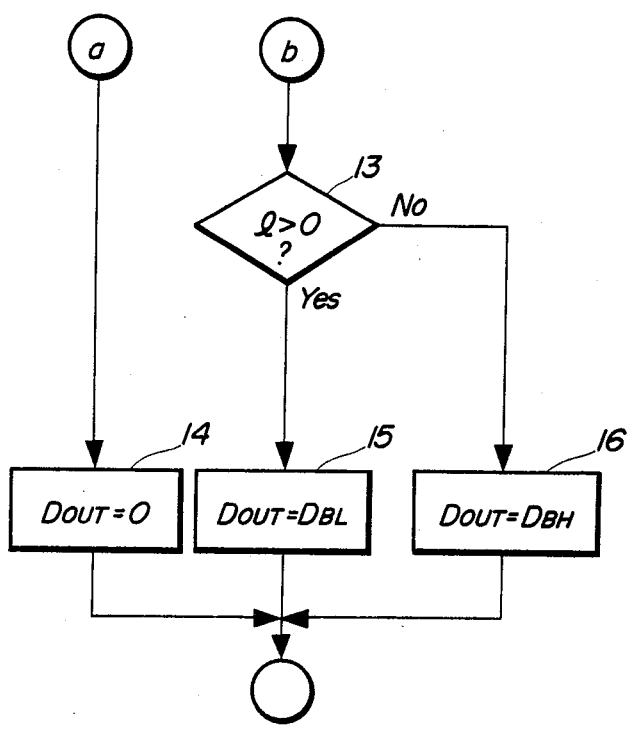
FIG. 4 is a flowchart showing another part of the program, applied to the first embodiment of the method according to the invention, which is executed following the execution of the part of the program of FIG. 3.

FIGS. 3 and 4 are flowcharts showing an example of the program for calculating the valve opening duty ratio DOUT for the solenoid valve 6, which is executed by the CPU 501 in FIG. 2. This program is executed in synchronism with generation of a predetermined control signal having a certain pulse repetition period, e.g. the TDC signal. First, in the step 1 of FIG. 3, a calculation is made of the desired flow rate value LCMD of supplementary air through the solenoid valve 6 to a value that causes an increase in the intake air quantity appropriate to a loaded condition of the engine at idle as stated before.

Following the execution of step 1 are executed steps 2 through 5, to determine which of flow rate regions the desired flow rate value LCMD calculated in the step 1 belongs to. To be specific, as shown e.g. in FIG. 5, a plurality of, e.g. five flow rate regions I-V are provided, which are defined by respective pairs of adjacent predetermined values LB0-LB5 of the flow rate of supplementary air being supplied to the engine set along the ordinate. The extreme predetermined value LB0 corresponds to a fully closed position of the solenoid valve 6 which is assumed when the valve opening duty ratio for the solenoid valve 6 is set to 0 percent, while the other extreme predetermined value LB5 corresponds to a fully open position of the valve 6 which is assumed when the duty ratio is set to 100 percent. The determinaton of which of these regions the calculated value LCMD belongs to is made in order to determine the valve opening duty ratio values DBH, DBL, as hereinafter referred to. For instance, if the desired flow rate value LCMD satisfies the relationship LB3<LCMD<LB4 (FIG. 5), the answers of the questions to all the steps 2 through 4 are negative or No, the answer to the question to the step 5 is accordingly affirmative or Yes so that the step 10 is executed. In the step 10, the valve opening duty ratio DBL, which is applied to cause decrease of the supplementary air quantity, as hereinafter described, is set to a predetermined value DBL3 which is slightly smaller than a value DB3' (FIG. 5), also hereinafter referred to, and the valve opening duty ratio DBH, which is applied to cause increase of the supplementary air quantity, as hereinafter described, to a predetermined value DBH4 which is slightly larger than a value DB4" (FIG. 5), also hereinafter referred to.

Figure 5:
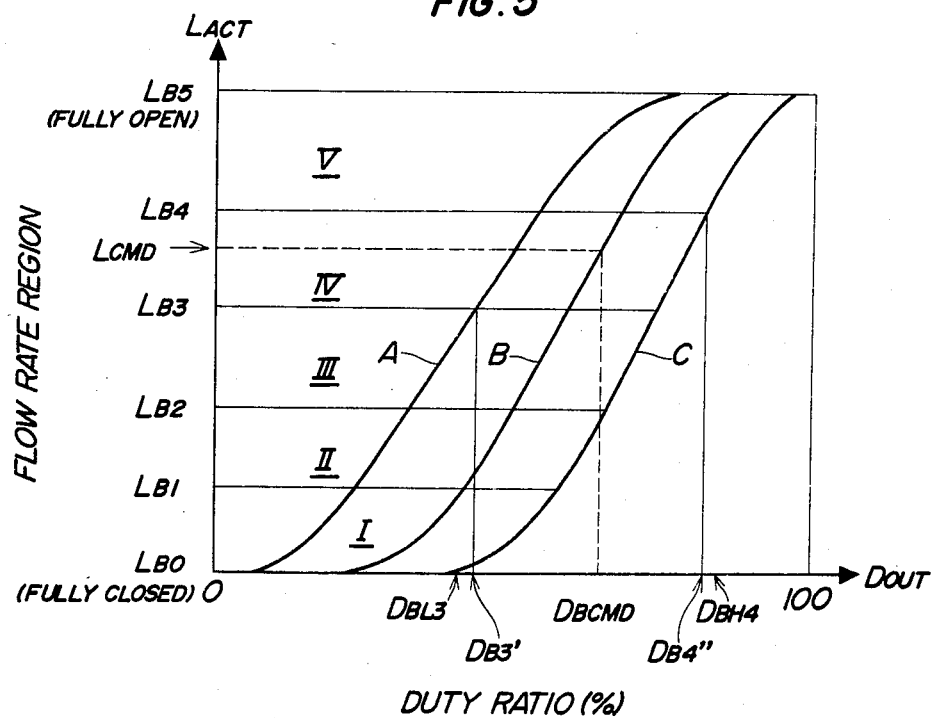
FIG. 5 is a graph showing the relationship between the duty ratio-to-flow rate characteristic of the solenoid control valve means and the first and second duty ratios DBL, DBH.

The manner of setting the above predetermined values DBL3, DBH4 will now be described by way of example: The curves A, B and C in FIG. 5 show the relationship between the flow rate of supplementary air supplied through the air passage 7 and the valve opening duty ratio DOUT. The curves A, C show possible extreme values or limits of a variable range of the flow rate characteristic of supplementary air flowing through the solenoid valve, depending upon machining tolerances, fitting and assembling tolerances, aging changes in the performance, etc. of the solenoid valve 6, the air passage 7, the flow rate sensor 12, etc., while the curve B shows median or average values of the extreme or limit values of the two curves A, C. The above predetermined value DBL3 of the valve opening duty ratio is set at a value slightly smaller than the aforementioned predetermined value DB3' which provides a minimum flow rate value LB3 in the flow rate region IV in which the desired valve opening value LCMD falls, that is, which corresponds to the intersection between the curve A and the line of the value LB3, while the predetermined value DBL4 is set at a value slightly larger than the predetermined value DB4" which provides a maximum flow rate value LB4 in the flow rate region IV in which the desired value LCMD falls, that is, which corresponds to the intersection between the curve C and the line of the value LB4.

Also when the desired flow rate value LCMD falls in any other flow rate region, a corresponding one of 7 through 11 is executed to read a predetermined valve opening duty ratio value DBH1-100 and 0-DBL4 previously set for the corresponding flow rate region in which the desired flow rate value LCMD falls. If the desired flow rate value LCMD satisfies the relationship LB0 (fully closed)$\leq$LCMD$\leq$LB1 (if the answer to the question of the step 2 is yes), the program proceeds to step 6 to determine whether or not the desired flow rate value LCMD is zero, that is, whether or not the engine is operating in a condition requiring no supply of supplementary air, i.e. the solenoid valve 6 should be fully closed. If the answer is negative or No, the step 7 is executed to set the valve opening duty ratio DBL for decreasing the supplementary air quantity to zero and set the valve opening duty ratio DBH for increasing the supplementary air quantity to a predetermined value DBH1 slightly larger than a duty ratio value DB1", not shown, which provides a maximum valve opening value LB1 or corresponds to the intersection between the curve C and the line of the value LB1.

If the answer to the question of the step 6 is affirmative or Yes, the program proceeds to the step 14 in FIG. 4 to set the valve opening duty ratio DOUT to zero, without calculating the values DBH, DBL.

If the desired flow rate value LCMD satisfies the relationship LB4<LCMD$\leq$LB5 (fully open position), that is, if the answer to the question of the step 5 is negative or No, the program proceeds to the step 11 wherein the valve opening duty ratio DBL for decreasing the supplementary air quantity is set to the predetermined value DBL4 slightly smaller than a duty ratio value DB4', not shown, providing a minimum flow rate value LB4 on the line intersecting with the curve A, and at the same time the valve opening duty ratio DBH for increasing the supplementary air quantity is set to 100 percent to fully open the solenoid valve 6.

Then, after setting of either a value DBH or a value DBL in any one of the steps 7 through 11, a calculation is made of the difference 1 between an actual flow rate value LACT sensed by the flow rate sensor 12 and the desired flow rate value LCMD, at the step 12, followed by determining the valve opening duty ratio DOUT of the solenoid valve 6 on the basis of the calculated difference l, at the steps 13 through 16 in FIG. 4.

First, in the step 13, it is determined whether or not the difference l is larger than zero. If the desired flow rate value LCMD falls in the flow rate region IV defined between LB3 and LB4 and the actual flow rate value LACT is larger than the desired flow rate value LCMD, that is, if the answer to the question of the step 13 is affirmative or Yes, the difference will be determined to be positive, and then the program proceeds to the step 15 to set the valve opening duty ratio DOUT to a value DBL. In the aforegiven example, the valve opening duty ratio DOUT is set in the step 15 to the predetermined value DBL3 which is slightly smaller than the duty ratio value DB3' as previously stated. The solenoid valve 6 is thus operated with the set valve opening duty ratio DBL3 which is smaller than a value DBCMD providing the desired flow rate value LACT (In FIG. 5, the value DBCMD is shown as applied to an intake air quantity-increasing device having a characteristic indicated by the curve B). As a consequence, the actual flow rate value LACT of supplementary air is necessarily decreased across the desired value LCMD to a value below the value LCMD, whatever value the desired value LCMD is set to within the region IV defined between LB3 and LB4, and irrespective of the type of the intake air quantity-increasing device having a characteristic falling within the range between the curves A, C.

Next, if the difference l (=LACT−LCMD) assumes a negative value, that is, if the answer to the question of the step 13 is negative or No, the program proceeds to the step 16, wherein the valve opening duty ratio DOUT is set to a value DBH for increasing the supplementary air quantity. In the present example, this duty ratio value DOUT is set to the predetermined value DBH4 slightly larger than the value DB4" which is larger than the value DBCMD providing the desired value LCMD. Accordingly, the actual flow rate value LACT is necessarily increased across the desired value LCMD to a value above the value LCMD.

By setting the valve opening duty ratio DOUT for the solenoid valve 6 in the above manner, regardless of the characteristics of the intake air quantity-increasing device actually applied, as shown by the curves A–C in FIG. 5, the supplementary air quantity can be controlled to the desired flow rate value LCMD or values very close thereto in a simple manner.

While in the above described embodiment the whole flow rate region is divided into five regions, the number of such divided regions may be selected at suitable value so as to minimize the overshooting or hunting of the actual flow rate value LACT with respect to the desired value LCMD, to an inappreciably much smaller value, thereby controlling the supplementary air quantity to the desired value with accuracy.

Next, reference is made to the exhaust gas recirculation control system to which the method according to the invention is applied as a second embodiment. In FIG. 1, an exhaust gas recirculating passageway 18 connects the exhaust pipe 13 to the intake pipe 2, and across which is mounted an exhaust gas recirculating valve 19. This valve 19 is a negative pressure-actuated type and comprises a valve body 19a arranged for opening and closing the passageway 18, a diaphragm 19b coupled to the valve body 19a and actuatable by negative pressure selectively applied thereto by means of an EGR control valve 22, hereinafter referred to, and a spring 19c urging the diaphragm 19b in the valve closing direction. A negative pressure chamber 19d is defined by the diaphragm 19b, which communicates with a communication passageway 20 for introducing negative pressure in the intake pipe 2 into the chamber 19d by way of the EGR control valve 22 which is a normally closed type and arranged across the communication passageway 20, and through an orifice 25 formed in the communication passageway 20 at a location downstream of the solenoid valve 22. An atmospheric pressure chamber 19e is defined by the diaphragm 19 and communicates directly with the atmosphere. An atmospheric pressure-intake passageway 23 is joined to the communication passageway 20 at a location downstream of the orifice 25 so that atmospheric pressure can be introduced into the communication passageway 20 by way of an orifice 21 formed in the atmospheric pressure-intake passageway 23, and then guided into the negative pressure chamber 19d. The EGR control valve 22 is electrically connected to the ECU 5, i.e. the driving circuit 513 in FIG. 2, for operation in response to a driving signal from the ECU 5, which corresponds to the valve opening duty ratio DOUT calculated by the CPU 501 in a manner similar to the manner previously described with respect to the preceding embodiment directed to the intake air quantity-increasing device, to control the lifting amount of the valve body 19a of the exhaust gas recirculation valve 19 and the lifting speed thereof.

A valve lift sensor 24 is mounted on the exhaust gas recirculating valve 19 for detecting the operating position of the valve body 19a of the valve 19 and supplying an electrical signal indicative of a detected operating position of the valve body to the ECU 5, specifically, to the signal processing circuit 511 in FIG. 2.

The ECU 5 is operates in response to the aforementioned various engine operating parameter signals to determine operating conditions of the engine and set a required amount of displacement of the diaphragm 19b of the exhaust gas recirculating valve 19, that is, a desired valve opening value LCMD of the valve body 19a connected to the diaphragm 19b, in lieu of setting a desired flow rate value of fluid or air flowing through the solenoid valve 22, in response to the determined operating conditions of the engine, as described below.

The setting of the valve opening duty ratio DOUT of the solenoid valve 22, the desired valve opening duty ratio value of the exhaust gas recirculation valve 19, and detection of the actual valve opening value of the exhaust gas recirculating valve 19 may be done in similar manners to those applied to setting of the valve opening duty ratio DOUT, desired value LCMD, detection of the actual valve opening value LACT, etc. of the solenoid valve 6 of the intake air quantity-increasing device according to the first embodiment, described hereinbefore, and therefore, the former values will be designated by the identical symbols as respective ones of the latter values, for the convenience of explanation, as in the other embodiments hereinafter described.

The ECU 5 operates on the desired valve opening value LCMD to calculate the valve opening duty ratio values DBH, DBL of the solenoid valve 22 for control in slow lift-increasing mode and in slow lift-decreasing mode, as hereinafter described, calculate the difference l between the actual valve opening value LACT sensed by the valve lift sensor 24 and the desired valve opening value LCMD, and determine which of quick mode and slow mode should be selected for execution of the control of the exhaust gas recirculating valve 19, and determine the valve opening duty ratio DOUT for the solenoid valve 22, which corresponds to the determined control mode. The ECU 5 supplies the solenoid valve 22 with a driving signal to operate same with the determined duty ratio DOUT.

When the solenoid valve 22 is energized with the duty ratio DOUT to open the communication passageway 20, negative pressure PB in the intake pipe 2 at a location downstream of the throttle valve 3 is introduced through the orifice 25 into the negative pressure chamber 19d of the exhaust gas recirculating valve 19 so that synthetic negative pressure formed by atmospheric pressure introduced through the atmospheric pressure-intake passageway 23 and the negative pressure PB will act upon the diaphragm 19b to upwardly displace same as in viewed in FIG. 1 against the force of the spring 19c until the valve body 19a assumes a valve opening value balancing with the synthetic negative pressure. If the solenoid valve 22 is deenergized (by setting the duty ratio DOUT to 0 percent) on this occasion, the negative pressure chamber 19d will be supplied with atmospheric pressure alone through the atmospheric pressure-intake passageway 23 so that the valve body 19a will be displaced in the valve closing direction. In this manner, the lifting amount of the exhaust gas recirculating valve 19 is controlled so as to allow a required amount of exhaust gases to be returned to the intake pipe 2.

Next, description will be made of the manner of setting the valve opening duty ratio DOUT of the solenoid valve 22 and the manner of controlling the solenoid valve 22 with the set duty ratio DOUT, which are executed by the CPU 501, with reference to FIGS. 3 and 5, already referred to, as well as to FIGS. 6 through 10.

Figure 6:
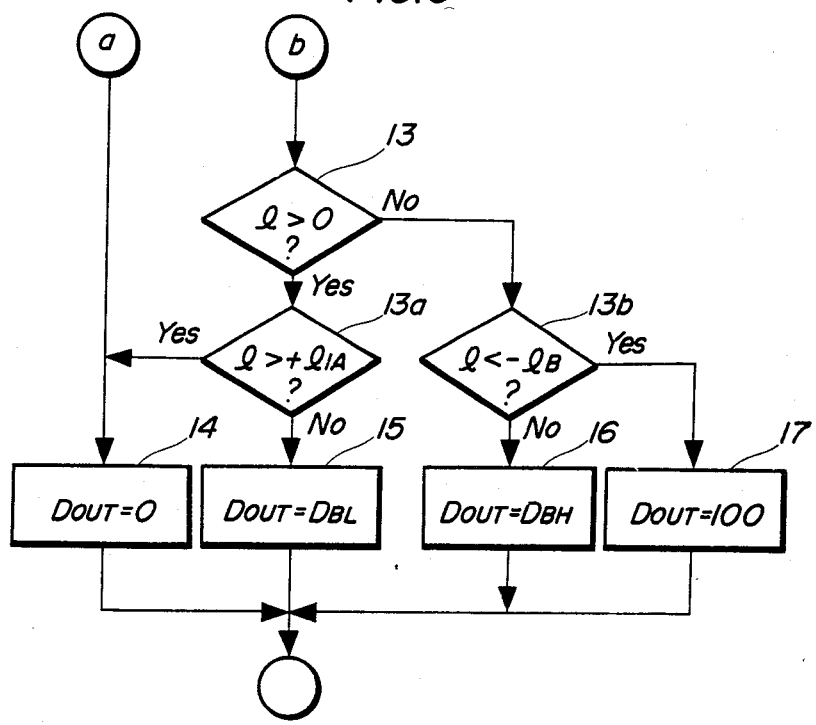
FIG. 6 is a flowchart showing still another part of the program, applied to the second embodiment of the method according to the invention, and also to third to sixth embodiments thereof, which is executed following the execution of the program part of FIG. 3.

The program for calculating the valve opening duty ratio DOUT for the solenoid valve 22, which may be substantially the same as that employed for control of the intake air quantity-increasing device, and shown in FIGS. 3 and 6, is executed in synchronism with a control signal having a constant pulse repetition period, pulses of which are generated at a time interval tSOL for instance, in lieu of the TDC signal applied in the previous embodiment directed to the intake air quantity-increasing device.

First, in the step 1 of FIG. 3, a calculation is made of the desired valve opening value LCMD for the exhaust gas recirculating valve 19 to set the same value to such a value as to allow exhaust gases to be returned to the intake pipe 2 in an amount appropriate to an operating condition in which the engine is operating, as stated before.

While in the previous embodiment directed to the intake air quantity-increasing device, the flow rate of air flowing through the solenoid valve 6 is sensed directly by the flow rate sensor 12, in the present embodiment the valve opening of the valve body 19a is sensed in lieu of direct detection of the flow rate, since the flow rate of fluid through the solenoid valve 22 and the amount of displacement of the diaphragm 19b are proportional to each other, with substantially the same results. To this end, a desired value LCMD of the valve opening of the exhaust gas recirculating valve 19 is set, in lieu of setting of a desired value of the flow rate of fluid through the solenoid valve 22.

Next, valve opening duty ratio values DBH, DBL, which are applied when the control is executed in slow mode, as hereinafter described, are determined, depending upon a valve opening region to which the set desired valve opening value LCMD belongs, in a manner similar to that previously mentioned with respect to the steps 2 through 11 in FIG. 3. To be specific, a plurality of, e.g. five predetermined valve opening regions are provided, ranging between extreme values LB0 and LB5 of valve opening corresponding, respectively, to a fully closed position of the exhaust gas recirculating valve 19 and a fully opened position of same. Values DBH, DBL for slow mode are read from among such predetermined values DBH, DBL previously set for each of the five valve opening regions, which fall in one of the five valve opening regions which corresponds to the desired valve opening value LCMD.

Next, the difference l between the actual valve opening value LACT sensed by the valve lift sensor 24 and the desired valve opening value LCMD is calculated at the step 12, and a value of the valve opening duty ratio DOUT is determined from the calculated difference l, in the steps 13 through 17 of FIG. 6 provided for the control of the solenoid valve 22. Incidentally, if the desired valve opening value LCMD calculated in the step 1 is found to be zero at the step 6 in FIG. 3, the program proceeds to the step 14 in FIG. 6 to set the valve opening duty ratio DOUT to zero, by omitting the setting of valve duty ratio values DBH, DBL.

Figure 7:
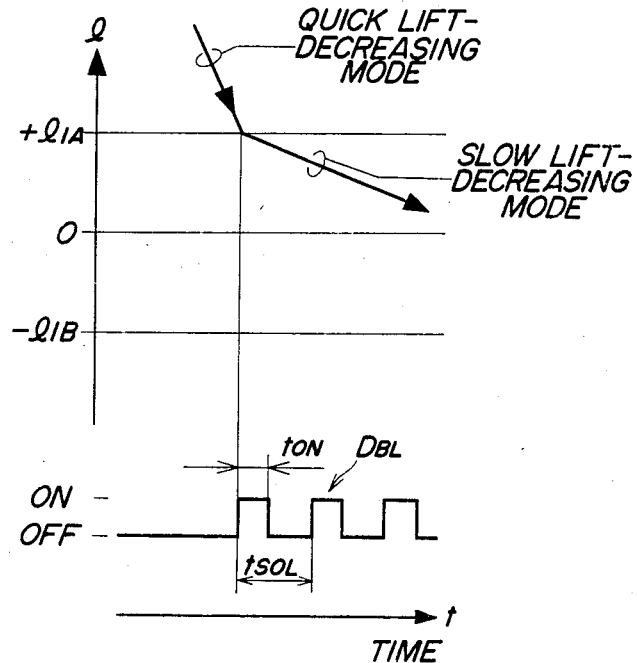
FIG. 7 is a timing chart showing a manner of the duty ratio control of solenoid control valve means according to second through sixth embodiments of the invention, applicable in the case where the actual valve opening is approaching toward a desired value from a larger value side of the latter.

In the step 13 of FIG. 6, a determination is made as to whether or not the difference l is larger than zero. If the actual valve opening value LACT of the exhaust gas recirculating valve 19 is larger than a value LB4 and at the same time the desired valve opening value LCMD is set to a value within the region IV defined between LB3 and LB4 for instance, the difference l will assume a positive value, that is, the answer to the question of the step 13 will be affirmative or Yes, and then the program proceeds to the step 13a to determine whether or not the difference l is larger than a predetermined positive value +1A. If the answer to this is yes, the program proceeds to the step 14 wherein the valve opening duty ratio DOUT for the solenoid valve 22 is set to zero so that the solenoid of the solenoid valve 22 is held in a deenergized state to keep the communication passageway 20 closed. On this occasion, atmospheric pressure alone is introduced into the negative pressure chamber 19d of the exhaust gas recirculating valve 19 through the atmospheric pressure-intake passageway 23, to thereby cause a closing motion of the valve body 19a of the exhaust gas recirculating valve 19 in quick lift-decreasing mode toward the desired position wherein the difference is zero, as indicated in FIG. 7. This closing motion of the valve body 19a in quick mode is repetedly executed until the answer to the question of the step 13a, which is executed at the predetermined time interval tSOL, becomes negative or No, that is, until the actual valve opening value LACT becomes closer to the desired value LCMD so that the difference l therebetween is smaller than the predetermined positive value +11A.

If the answer to the question of the step 13a is negative or No, that is, if the relationship $0 < l \leq +11A$ stands, the program proceeds to the step 15, wherein the valve opening duty ratio DOUT of the solenoid valve 22 is set to a value DBL for control in slow lift-decreasing mode, and then the solenoid of the solenoid valve 22 is energized with the set duty ratio DOUT (=tON/tSOL in FIG. 7). Since the duty ratio DBL for slow lift-decreasing mode control is set to the predetermined value DBL3 slightly smaller than the value DB3' (FIG. 5), the slow valve closing motion is continued until the actual valve opening value LACT is reduced across the desired value LCMD to a value below same, in a manner similar to that employed in the preceding embodiment.

Figure 8:
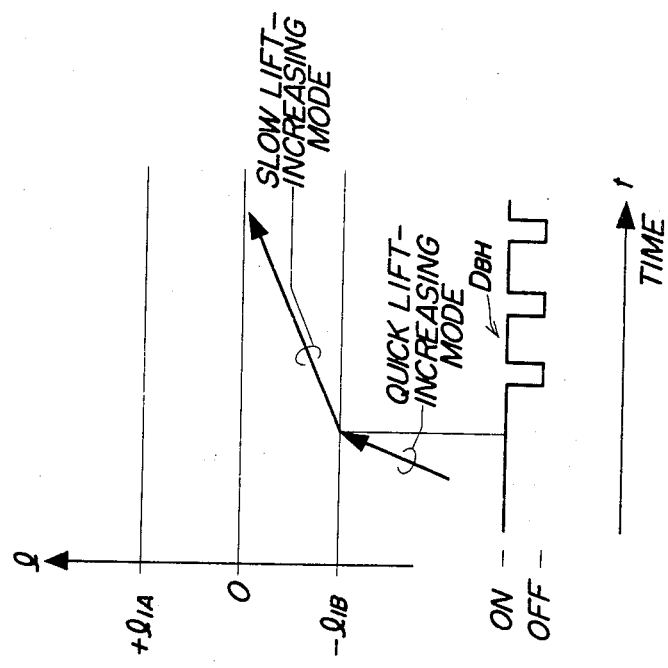
FIG. 8 is a timing chart similar to FIG. 7 applicable in the case where the actual valve opening value is apporoaching toward the desired value from a smaller value side of the latter.

On the contrary to the above, if the actual valve opening value LACT of the exhaust gas recirculating valve 19 is smaller than the desired valve opening value LCMD, the difference l will assume a negative value, that is, the answer to the question of the step 13 will be negative. In such case, the program proceeds to the step 13b to determine whether or not the difference l is smaller than a predetermined negative value −11B. If the answer is affirmative, the program proceeds to the step 17, wherein the valve opening duty ratio DOUT of the solenoid valve 22 is set to 100 percent, that is, the solenoid of the same valve is constantly energized to keep the communication passageway 20 open. On this occasion, the negative pressure chamber 19d of the exhaust gas recirculating valve 19 is supplied with negative pressure PB at a maximum rate, to cause a valve opening motion of the valve body 19a of the exhaust gas recirculating valve 19 in quick lift-increasing mode toward the desired position wherein the difference l is zero, as shown in FIG. 8. This quick valve opening motion of the valve 19 is repeated until the answer to the question of the step 13b becomes negative or No.

If the answer to the question of the step 13b is negative or No, that is, the relationship −11B≦l<0 stands, the program proceeds to the step 16 to set the valve opening duty ratio DOUT of the solenoid valve 22 to a value DBH for slow lift-increasing mode control whereby the solenoid of the solenoid valve 22 is energized with the set duty ratio DOUT. Since the valve opening duty ratio DBH for slow lift-increasing mode control is set at a predetermined value DBH4 slightly larger than a value DB4'', the exhaust gas recirculating valve 19 repeatedly makes its valve opening motion until the actual valve opening value LACT exceeds the desired value LCMD after the duty ratio DOUT has been set to the predetermined value DBH.

Then, by referring to FIG. 9, description will be made in detail as to the manner of maintaining the actual valve opening value LACT at the desired value LCMD or a value close thereto when the difference satisfies the relationship −11B<l<+11A, that is, when the actual valve opening value LACT has reached the desired value or a value close thereto.

Figure 9:
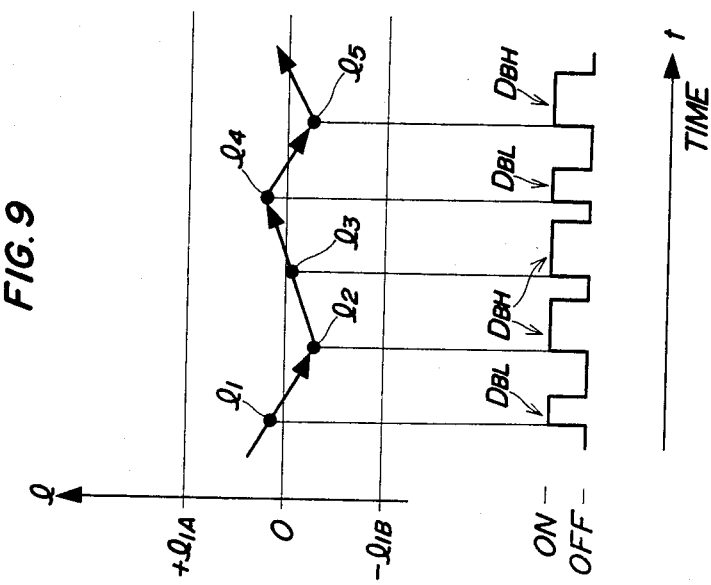
FIG. 9 is a timing chart similar to FIG. 7, applicable in the case where the actual valve opening is maintained at or in the vicinity of the desired value.

In FIG. 9, assuming that the difference l has a value l1B(+11A>l1>0), the aforementioned step 15 of FIG. 6 is executed to set the valve opening duty ratio DOUT to a predetermined value DBL, whereby the valve body 19a of the exhaust gas recirculating valve 19d makes a valve closing motion in slow lift-decreasing mode. When the difference l decreases across 0 and then assumes a negative value l2, the step 16 of FIG. 6 is executed to set the valve opening duty ratio DOUT to a predetermined value DBH, whereby the valve body 19a makes a valve opening motion in slow lift-increasing mode. Even when the difference l assumes a value l3 which is still negative, the slow lift-increasing mode control is continued at the step 16. When a value l4 is assumed, which is positive, the slow lift-decreasing mode control is executed at the step 15. In this manner, depending upon whether or not the difference l assumes a positive value or a negative value, the slow lift-increasing mode control and the slow lift-decreasing mode control is alternately executed repeatedly, so as to maintain the valve opening of the valve 19 at the desired value LCMD or a value close thereto.

The above values 11A, 11B are set at such values that the region defined between these values is narrower than a maximum allowable hunting width of the actual valve opening value LACT with respect to the desired value LCMD.

Figure 10:
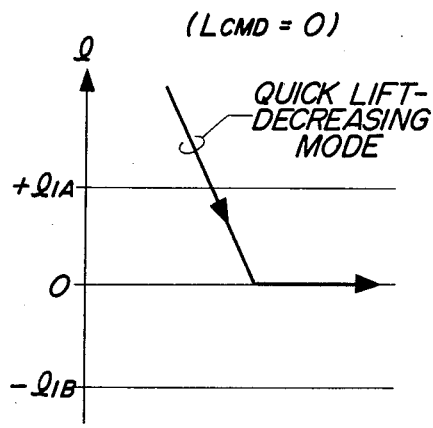
FIG. 10 is a timing chart similar to FIG. 7, applicable in the case where the duty ratio is set to zero.

If the answer to the question of the step 6 in FIG. 3 is affirmative or Yes, that is, if the desired value LCMD is set to a value of 0 causing full closing of the exhaust gas recirculating valve 19, the duty ratio DOUT of the solenoid valve 22 is set to and maintained at zero until the actual valve opening value LACT is reduced to zero, without setting the valve opening duty ratio in slow lift-decreasing mode (FIG. 10). Since there is no fear of overshooting or hunting of the valve body 19a in bringing the exhaust gas recirculating valve 19 into a fully closed position, the valve body 19a has only to be closed in quick lifting-decreasing mode, as noted above.

Although in the above described second embodiment the solenoid valve 22 arranged in the communication passageway 20 for introduction of negative pressure PB is of the normally closed type, the invention is not limited to such arrangement, alternatively, a normally open type solenoid valve may be arranged in the atmospheric pressure-intake passageway 23. In this alternative arrangement, a similar manner of control to the one described above can apply, description of which is therefore omitted.

Further alternatively, a normally open type solenoid valve may be arranged as the solenoid valve 22 in the communication passageway 20, or a normally closed type solenoid valve may be arranged in the atmospheric pressure-intake pasageway 23. In this alternative arrangement, the manner of setting of the duty ratio of the solenoid valve 22 should be reverse to that described with reference to FIGS. 3 through 10, so that in the case that the solenoid valve 22 of FIGS. 3 through 10 requires energization, the valve 22 of this alternative arrangement should be deenergized, and vice versa, to obtain substantially the same results as in the above described second embodiment. Also, the manner of control applicalble to this alternative arrangement can be easily deduced from the foregoing description of the second embodiment, description of which is therefore omitted.

Figure 11:
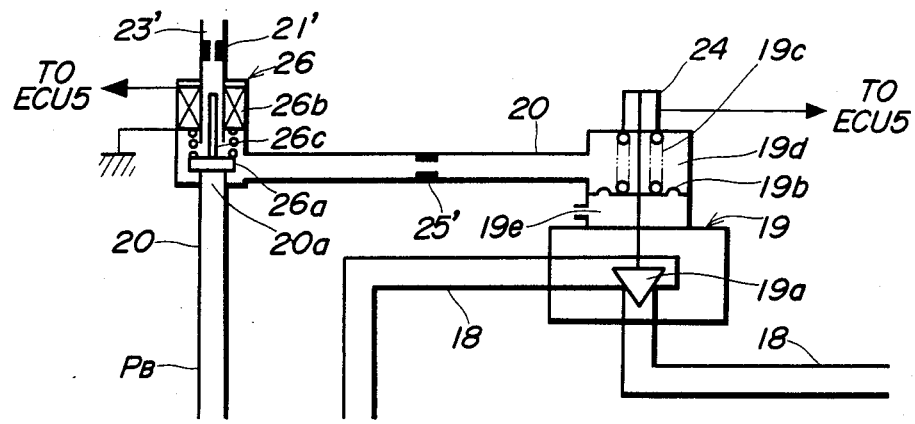
FIG. 11 is a block diagram illustrating the arrangement of an exhaust gas recirculation control system for an internal combustion engine, including a three-way solenoid valve as the solenoid control valves means, to which is applied the method of the invention as the third embodiment.

FIG. 11 illustrates the arrangement of an exhaust gas recirculation control system to which is applied the method according to the invention as a third embodiment, wherein the solenoid valve 22 arranged in the communication assageway 20 in FIG. 1 is superseded by a three-way solenoid valve 26. In FIG. 11, elements and parts corresponding to those in FIG. 1 are designated by identical reference numerals and have substantially the same functions and operations as the latter.

The solenoid valve 26 has its solenoid 26b electrically connected to the ECU 5. With the arrangement of FIG. 11, when the solenoid 26b is in an energized state, valve body 26a of the valve 26 is in a position closing an opening 26c which communicates with the atmosphere via an atmospheric pressure-intake passageway 23' and an orifice 21' formed in the same passageway 23', and at the same time opening the communication passageway 20 to allow negative pressure PB in the intake pipe 2 at a location downstream of the throttle valve therein to be introduced through an orifice 25' formed in the passageway 20 into the negative pressure chamber 19d of the exhaust gas recirculating valve 19. On the other hand, when the solenoid 26b is in a deenergized state, the valve body 26a is in a position closing an opening 20a of the communication passageway 20 and at the same time opening the above-mentioned opening 26c to allow introduction of atmospheric pressure into the negative pressure chamber 19d.

Thus, according to this arrangement, by regulating the valve opening duty ratio DOUT of the solenoid valve 26, it is possible to control the synthetic flow rate of air flowing in through the atmospheric pressure-intake passageway 23' and air having the negative pressure PB in the intake pipe 2, that is, a synthetic operating pressure formed by atmospheric pressure and negative pressure PB, acting upon the diaphragm 19b of the exhaust gas recirculating valve 19.

The FIG. 11 arrangement can provide substantially the same results as those obtained by the aforedescribed second embodiment by controlling the valve opening duty ratio of the solenoid valve 26 in a manner similar to that of the second embodiment. A manner of controlling the solenoid valve 26 for producing such results can be easily deduced from the foregoing description given with reference to FIGS. 3 through 5 and FIG. 10, description of which is therefore omitted. Although in FIG. 11 the three-way solenoid valve 26 is of the normally closed type and disposed to allow introduction of negative pressure PB into the negative pressure chamber 19d of the exhaust gas recirculating valve 19 when enegized, the same valve 26 may be of the normally open type and disposed to allow introduction of negative pressure PB into the chamber 19d when deenergized. In the latter or alternative arrangement, the energizing time and the deenergizing time for the solenoid valve 26 should be set in a manner reverse to that of the FIG. 11 arrangement, to obtain substantially the same results as mentioned above.

Figure 12:
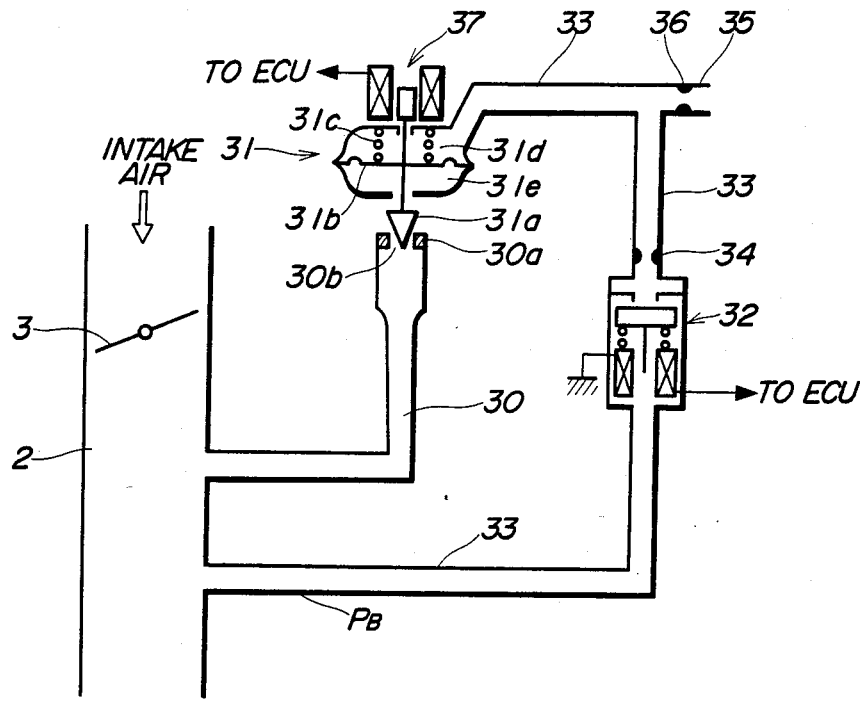
FIG. 12 is a block diagram illustrating the arrangement of another intake air quantity-increasing device for an internal combustion engine, to which is applied the method of the invention as the fourth embodiment.

FIG. 12 shows the arrangement of another example of the intake air quantity-increasing device which controls the idling speed of an internal combustion engine to a predetermined value, to which is applied the method according to the invention as a fourth embodiment.

An air passage 30 opens at one end in the intake pipe 2 in FIG. 1 at a location downstream of the throttle valve 3 therein, and communicates at the other end with the atmosphere. An intake air quantity-increasing valve 31 is provided at an open end 30a of the air passage 30 exposed to the atmosphere, which is of the negative pressure-actuated type, and mainly comprised of a valve body 31a disposed to close and open an opening 30b in the open end 30a, a diaphragm 31b actuatable in response to negative pressure applied thereto, which negative pressure is controlled by a solenoid valve 32, hereinafter referred to, and a spring 31c urging the diaphragm 31b in the valve closing direction. The diaphragm 31b defines at its opposite sides a negative pressure chamber 31d and an atmospheric pressure chamber 31e. The former communicates with a communication passageway 33 so that negative pressure or vacuum developed in the intake pipe 2 is introduced into the negative pressure chamber 31d via the solenoid valve 32 disposed across the communication passageway 33, which is of the normally closed type, and also via an orifice 34 formed in the passageway 33 at a location downstream of the valve 32. The atmospheric pressure chamber 31e communicates with the atmosphere. Further, an atmospheric pressure-intake passageway 35 is connected to the communication passageway 33 at a location downstream of the orifice 34, to introduce atmospheric pressure into the communication passageway 33 through an orifice 36 formed in the atmospheric pressure-intake passageway 35 and then into the negative pressure chamber 31d. The solenoid valve 32 is connected to an electronic control unit (hereinafter called "ECU"), not shown, like the solenoid valve 22 in FIG. 1, to be driven by a driving signal from the ECU for controlling the lifting amount and lifting speed of the valve body of the intake air quantity-increasing valve 31.

A valve lift sensor 37 is mounted on the intake air quantity-increasing valve 31 to detect the operating position of the valve body 31a and supply a signal indicative of the detected operating position to the ECU.

Assuming now that it is required to increase the intake air quantity to maintain the engine rotational speed at a predetermined desired value at idle of the engine with the throttle valve 3 fully closed, the ECU sets a desired valve opening value LCMD for the intake air quantity-increasing valve 31, which corresponds to an intake air quantity required by the engine, in the same manner as the intake air quantity-increasing device 6 in FIG. 1, and controls the valve opening duty ratio of the solenoid valve 32 so as to attain the set desired valve opening value LCMD, in a similar manner to that described with reference to FIGS. 3 through 5. When the solenoid valve 32 is energized with the duty ratio controlled as above to open the communication passageway 33, negative pressure PB of the magnitude corresponding to the controlled duty ratio is introduced into the negative pressure chamber 31d so that synthetic operating negative pressure formed by the negative pressure PB and atmospheric pressure introduced through the atmospheric pressure-intake passageway 35 increases to cause displacement of the diaphragm 31b to open the value body 31a, thereby increasing the intake air quantity by a required amount.

When no increase of the intake air quantity is required, the ECU sets the valve opening duty ratio of the solenoid valve 32 to zero to interrupt the supply of electric power to the solenoid valve 32 to thereby close the communication passageway 33 so that atmospheric pressure alone is introduced into the negative pressure chamber 31d through the atmospheric pressure-intake passageway 35. As a consequence, the differential pressure between the atmospheric pressure chamber 31e and the negative pressure chamber 31d becomes smaller so that the diaphragm 31b is displaced to fully close the intake air quantity-increasing valve 31.

Details of the manner of controlling the valve opening duty ratio of the solenoid valve 32, and accordingly the manner of controlling the intake air quantity-increasing valve 31 can be substantially identical with those already described with reference to FIGS. 3 through 5, and FIG. 10, description of which is therefore omitted.

Figure 13:
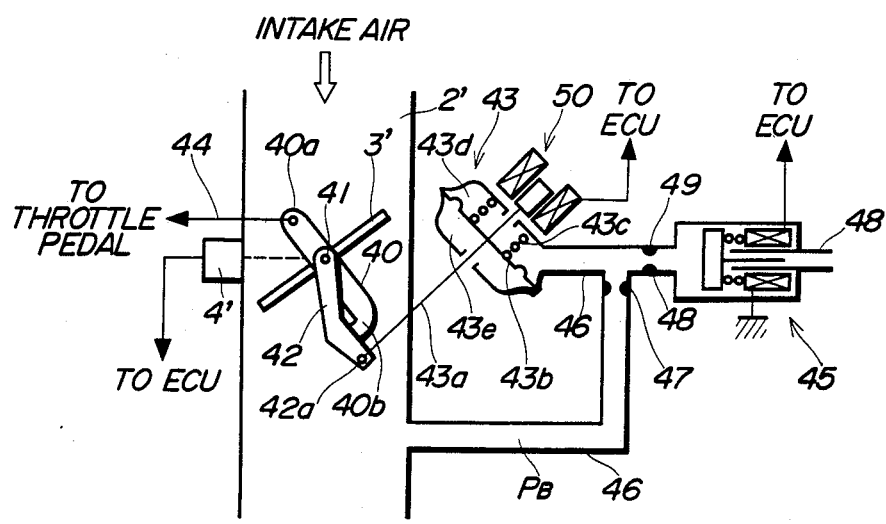
FIG. 13 is a block diagram illustrating the arrangement of still another intake air quantity-increasing device, to which is applied the method of the invention as the fifth embodiment, wherein the device is adapted to forcibly open the throttle valve of the engine to a predetermined degree of valve opening from its fully closed position to increase the intake air quantity.

FIG. 13 shows the arrangement of negative pressure-actuated throttle valve-forced opener means for controlling the valve opening of a throttle valve for increase of the intake air quantity, to which is applied the method of the invention as a fifth embodiment.

A throttle valve 3' arranged in an intake pipe 2' of an internal combustion engine is formed integrally with a lever 40 for rotating the throttle valve 3' about its own axis formed by a fulcrum shaft 41. Another lever 42 is connected at one end to the fulcrum shaft 41 and has its other end shaped in the form of an arm 42a to which is connected a rod 43a forming part of a negative pressure-responsive actuator 43. The lever 40 extends in opposite directions with respect to the fulcrum shaft 41, and is connected at one end 40a to a wire cable 44 connected to a throttle pedal, not shown, and has its other end 40b disposed for urging contact with the lever 42 in the vicinity of the arm 42a for limiting rotational displacement of the lever 40 and accordingly rotational displacement of the throttle valve 3' in its closing direction.

The negative pressure-responsive actuator 43 comprises the above-mentioned rod 43a disposed to pull up and push down the lever 42, a diaphragm 43b displaceable by synthetic operating pressure formed of intake pipe negative pressure and atmospheric pressure, which is controlled by a solenoid valve 45, hereinafter referred to, and a spring 43c urging the diaphragm 43b in the direction of pushing down the lever 42 through the rod 43a. The diaphragm 43b disposed within the casing of the actuator 43 cooperates with the same casing to define at its opposite sides a negative pressure chamber 43d and an atmospheric pressure chamber 43e, the latter communicating with the atmosphere, and the former being connected to a pipe 46 connected to the intake pipe 2 at a location downstream of the throttle valve 3'. An orifice 47 is formed in the pipe 46. An atmospheric pressure-intake passageway 48 is connected to the pipe 46 at a location intermediate between the orifice 47 and the negative pressure-responsive actuator 43, and across which passageway is arranged the solenoid valve 45 which is of the normally open type. The solenoid valve 45 is electrically connected to an electronic control unit or ECU, not shown, and disposed such that when it is deenergized, atmospheric pressure is introduced into the pipe 46 through an orifice 49 formed in the atmospheric pressure-intake passageway 48 at a location downstream of the solenoid valve 45 and then introduced into the negative pressure chamber 43d.

A valve lift sensor 50 is mounted on the negative pressure-responsive actuator 43 for detecting the amount of displacement of the rod 43a, that is, the valve opening of the throttle valve 3', and supplies a signal indicative of the detected value to the ECU.

The operation of the throttle valve-forced opener means constructed as above will now be described.

When the throttle pedal, not shown, is not stepped on at all, the throttle valve 3' is biased in its closing or clockwise extreme position means by the force of a spring, not shown, wherein the end 40b of the lever 40 is kept in urging contact with the lever 42. Assuming now that it is required to increase the intake air quantity in order to maintain the engine rotational speed at a predetermined desired value at idle of the engine with the throttle valve 3' thus fully closed, the ECU sets a desired valve opening value LCMD for the throttle valve 3' and controls the duty ratio of energization of the solenoid valve 45 so as to bring the throttle valve 3' to assume a valve opening equal to the desired valve opening value LCMD, in substantially the same manner as previously described with reference to FIGS. 3 through 5. As the solenoid valve 45 is energized with the duty ratio set as above, the atmospheric pressure-intake passageway 48 is closed for a period of time corresponding to the duty ratio to decrease the flow rate of atmospheric pressure introduced through the same passageway 48 so that synthetic operating negative pressure of intake pipe negative pressure PB and atmospheric pressure grows.

As the synthetic operating negative pressure thus increased is introduced into the negative pressure chamber 43d, the difference between pressures acting upon the opposite side surfaces of the diaphragm 43b increases to cause the diaphragm 43b to be displaced in the direction of decreasing the volume of the chamber 43d against the force of the spring 43c, i.e. in the rightward and upward direction as viewed in FIG. 13. Accordingly, the rod 43a connected to the diaphragm 43b is diplaced to cause rotation of the lever 42 in the counterclockwise direction. This rotation causes corresponding rotation of the lever 40 and the throttle valve 3' integral therewith so that the throttle valve 3' opens to cause increase of the intake air quantity by a required amount.

When no increase of the intake air quantity is required, the ECU sets the duty ratio of energization of the solenoid valve 45 to zero to interrupt the supply of electric power to the same valve to thereby maintain the atmospheric pressure-intake passageway 48 open. On this occasion, atmospheric pressure is introduced through the atmospheric pressure-intake passageway 48 into the negative pressure-chamber 43d of the actuator 43 at a larger rate, to reduce the synthetic operating negative pressure whereby the diaphragm 43b of the actuator 43 is displaced by the force of the spring 43c in the direction of increasing the volume of the negative pressure chamber 43d, i.e. in the leftward and downward direction as viewed in FIG. 13, so that the lever 42 is pushed down through the rod 43a to allow the throttle valve 3' to be returned to its fully closed position by the force of the spring, not shown.

When the throttle pedal is stepped on, it causes, through the wire cable 44, counterclockwise rotation of the lever 40 whereby the throttle valve 3' is accordingly rotated to an open position corresponding to the stepping-on amount of the throttle pedal. Incidentally, when the throttle pedal is stepped on, the lever 40 is accordingly rotated irrespective of the position of the lever 42, allowing same to maintain its position.

The manner of setting the duty ratio of energization of the solenoid valve 45 and the manner of controlling the valve opening of the throttle valve 3 to a desired value can be easily deduced from reference to FIGS. 3 through 5 and FIG. 10, description of which is therefore omitted.

The solenoid valve 45 may be of the normally closed type. Further, a solenoid valve may be arranged in the pipe 46 at a location upstream of the orifice 47, to supersede the solenoid valve 45 arranged across the atmospheric pressure-intake passageway 48.

Figure 14:
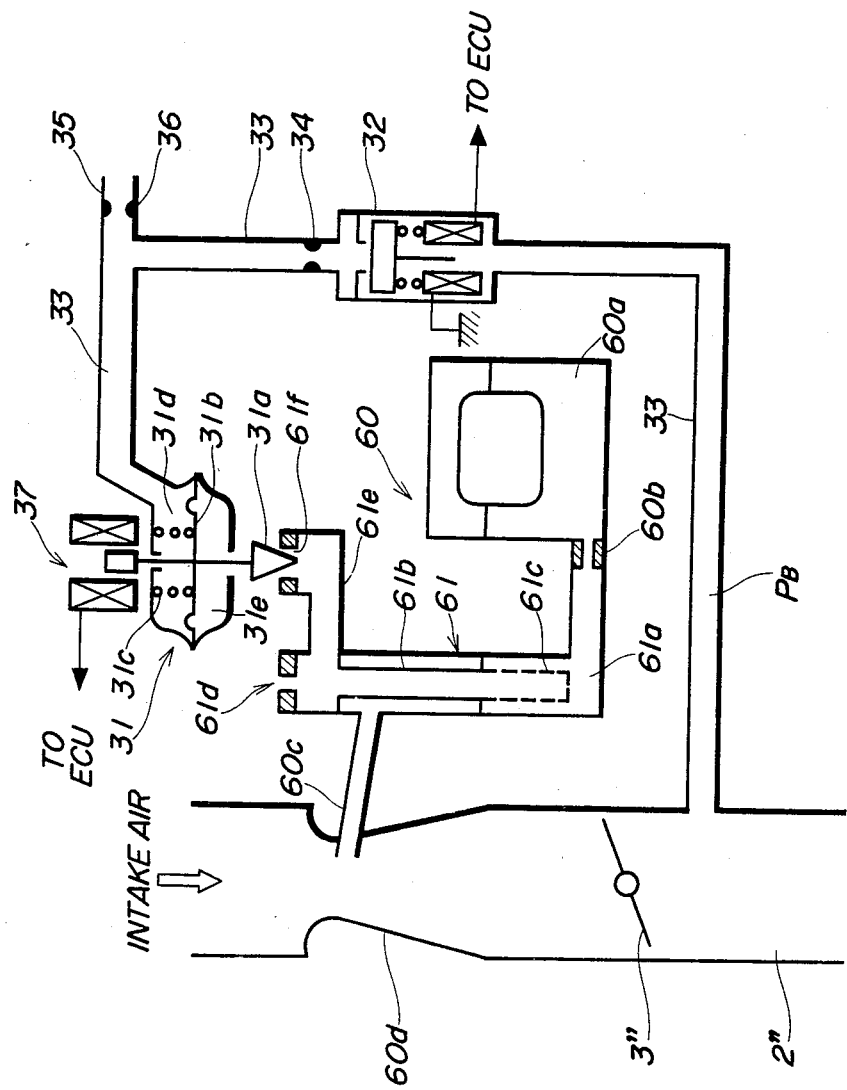
FIG. 14 is a block diagram illustrating the arrangement of an air-fuel ratio control system for an internal combustion engine, to which is applied the method of the invention as the sixth embodiment.

FIG. 14 shows the arrangement of an air-fuel ratio control system for an internal combustion engine, which forms part of a carburetor of the engine, to which is applied the method of the invention as a sixth embodiment. In FIG. 14, elements and parts corresponding to those in FIG. 12 are designated by identical reference numerals and have the same functions as the latter.

The carburetor 60 has its float chamber 60a communicating with a main well 61a of an air bleed section 61 of the carburetor through a main jet 60b. The main well 61a in turn communicates with the interior of a venturi 60d arranged in a portion of an intake pipe 2" upstream of a throttle valve 3" therein, through a main nozzle 60c. An emulsion tube 61b is immersed in fuel in the main well 61a, which has its immersed lower end closed and formed with a multiplicity of bleed holes 61c at its peripheral surface, and its upper end provided with a main air jet 61d through which air is introduced into the emulsion tube 61b. A supplementary air tube 61e is connected at one end to an upper end portion of the emulsion tube 61b and is provided at the other end with a supplementary air jet 61f. An air-fuel ratio control valve 31 is disposed to vary the sectional area of the opening of the supplementary air jet 61f.

Negative pressure developed in the venturi 60d in the intake pipe 2" is transmitted to the main well 61a of the air bleed section 61 through the main nozzle 60c to affect the main well pressure. When the difference between the main well pressure and the atmospheric pressure exceeds a predetermined value, bleed air is drawn into the emulsion tube 61b through the main air jet 61d and the supplementary air jet 61f and guided into the main well 61a through the bleed holes 61c to be mixed with fuel therein which has been supplied through the main jet 60b from the float chamber 60a. As the amount of bleed air mixed into the fuel increases, the flow speed of air through a passage formed by the main nozzle 60c and the emulsion tube 61b increases, which results in increased pressure loss in the passage. Consequently, the amount of fuel supplied to the engine decreases to increase or lean the air-fuel ratio. The amount of bleed air is controlled by varying the sectional area of the opening of the supplementary air jet 61f, that is, the valve opening of the air-fuel ratio control valve 31 determined by the position of the valve body 31a. Thus, the air-fuel ratio of an air-fuel mixture being supplied to the engine can be controlled to a desired value by controlling the valve opening of the air-fuel ratio.

The manner of controlling the valve opening of the air-fuel ratio control valve 31, the manner of setting the duty ratio of the solenoid valve 32, etc. can be substantially identical with those described with reference to FIGS. 3, FIG. 5 through 10, and FIG. 12, description of which is therefore omitted.

Although the air-fuel ratio control valve 31 in FIG. 14 is disposed to vary the opening of the supplementary air jet 61f for control of the bleed air amount, the control valve 31 may alternatively be disposed so as to vary the sectional area of the opening of the main jet 60b to thereby control the flow rate of fuel from the float chamber 60a through the same jet.

The solenoid valve 32 may be of the normally open type, instead. Otherwise, the solenoid valve 32 may be arranged across the atmospheric pressure-intake passageway 35.

Further, although the second to sixth embodiments described above are each arranged such that synthetic operating negative pressure regulated by the solenoid valve is introduced into the negative pressure chamber 19d, 31d or 43d of the nagative pressure-actuated valve, such arrangement is not limitative, but alternatively, synthetic operating pressure may be formd by pressurized air from a pressurized air source such as a compressor provided in the engine and atmospheric air, and introduced into the atmospheric pressure chamber 19e, 31e or 43e of the negative pressure-actuated valve, while the negative pressure chamber 19d, 31d or 43d may be communicated with the atmosphere. Even such alternative arrangement can provide substantially the same results as the aforedescribed second to sixth embodiments, by controlling the duty ratio of the solenoid valve in a suitable manner.

What is claimed is:

1. A method of controlling a duty ratio with which solenoid control valve means arranged in a fluid passage is to be driven, to thereby control the flow rate of fluid flowing in said fluid passage to a desired value, the method comprising the steps of:
   (1) dividing into a plurality of flow rate value regions a range of flow rate values between a first extreme flow rate value and a second extreme flow rate value which can be assumed by said fluid, respectively, when the duty ratio for said solenoid control valve means produced in each lot assumes a predetermined miminum value and a predetermined maximum value;
   (2) setting beforehand a first predetermined value of duty ratio corresponding to each of said divided flow rate regions of the step (1), and a second predetermined value of duty ratio corresponding to said each of said divided flow rate regions and larger than said first predetermined value of duty ratio, said first and second predetermined values of duty ratio being dependent upon the magnitude of variations of duty ratio-to-flow rate characteristic of said solenoid control valve means in each lot;
   (3) detecting an actual value of the flow rate of said fluid;
   (4) setting the duty ratio for said solenoid control valve means to said second predetermined value corresponding to one of said divided flow rate regions to which said desired flow rate value pertains, when the actual value of the flow rate of said fluid detected in the step (3) is on the side of said first extreme flow rate value with respect to said desired flow rate value;
   (5) driving said solenoid control valve means with the duty ratio set in the step (4);
   (6) setting the duty ratio for said solenoid control valve means to said first predetermined value corresponding to one of said divided flow rate regions to which said desired flow rate value pertains, when the actual value of the flow rate of said fluid detected in the step (3) is on the side of said second extreme flow rate value with respect to said desired flow rate value; and
   (7) driving said solenoid control valve means with the duty ratio set in the step (6).

2. A method as claimed in claim 1, wherein in the step (4), when the detected actual flow rate value of said fluid is on the side of said first extreme flow rate value with respect to said desired flow rate value and within a first predetermined range from said desired flow rate value at the same time, the duty ratio for said solenoid control valve means is set to said second predetermined value.

3. A method as claimed in claim 2, wherein in the step (4), when the detected actual flow rate value of said fluid is on the side of said first extreme flow rate value with respect to said desired flow rate value and outside said first predetermined range from said desired flow rate value at the same time, the duty ratio for said solenoid control valve means is set to said predetermined maximum value.

4. A method as claimed in claim 1, wherein said predetermined maximum value of duty ratio is 100 percent.

5. A method as claimed in claim 1, wherein in the step (6), when the detected actual flow rate value of said fluid is on the side of said second extreme flow rate value with respect to said desired flow rate value and within a second predetermined range from said desired flow rate value at the same time, the duty ratio for said solenoid control valve means is set to said first predetermined value.

6. A method as claimed in claim 5, wherein in the step (6), when the detected actual flow rate value of said fluid is on the side of said second extreme flow rate value with respect to said desired flow rate value and outside said second predetermined range from said desired flow rate value at the same time, the duty ratio for said solenoid control valve means is set to said predetermined minimum value.

7. A method as claimed in claim 1, wherein said predetermined minimum value of duty ratio is 0 percent.

8. A method as claimed in any of claims 1 through 7, which is adapted to control the flow rate of a fluid flowing in said fluid passage which is connected at one end to an intake passage of an internal combustion engine at a location downstream of a throttle valve arranged in said intake passage, and communicates at the other end with the atmosphere, said fluid comprising air.

9. A method as claimed in any of claims 1 through 7, which is applied to a control system for controlling a control valve for regulating the flow rate of said fluid being supplied to an internal combustion engine, said control system including a first hydraulic pressure source for supplying a first fluid, a second hydraulic pressure source for supplying a second fluid, a pressure responsive element connected to said control valve and displaceable by a synthetic operating hydraulic pressure determined by the ratio in flow rate between said first fluid from said first hydraulic pressure source and said second fluid from said second hydraulic pressure source, a first operating fluid passage for guiding said first fluid to said pressure responsive element, and a second operating fluid passage for guiding said second fluid to said pressure responsive element, wherein said solenoid control valve means is arranged in one of said first and second operating fluid passages.

10. A method as claimed in claim 9, wherein said engine has an intake passage, said first fluid from said first hydraulic pressure source being intake air in said intake passage as intake passage pressure, and said second fluid from said second pressure source being atmospheric air as atmospheric pressure.

11. A method as claimed in claim 9, wherein the detection of the actual flow rate value of said fluid of the step (3) is effected by detecting an amount of displacement of said pressure responsive element, said desired flow rate value being expressed in terms of a desired amount of displacement of said pressure responsive element.

12. A method as claimed in claim 9, wherein said control valve comprises a control valve for controlling at least one of the amount of intake air, the amount of fuel, and the amount of recirculated exhaust gases, which are being supplied to said engine.

13. A method as claimed in any of claims 1 through 7, which is applied to a control system for controlling a control valve for regulating the flow rate of a fluid being supplied to an internal combustion engine, said control system including a first hydraulic pressure source for supplying a first fluid, a second hydraulic pressure source for supplying a second fluid, a pressure responsive element connected to said control valve and displaceable by a synthetic operating hydraulic pressure determined by the ratio in flow rate between said first fluid from said first hydraulic pressure source and said second fluid from said second hydraulic pressure source, a first operating fluid passage communicating said pressure responsive element with said first hydraulic pressure source, and a second operating fluid passage branching off from an intermediate portion of said first operating fluid passage and communicating with said second hydraulic pressure source, wherein said solenoid control valve means is arranged in a junction of said second operating fluid pasage with said first operating fluid passage, said solenoid control valve comprising a three-way solenoid valve adapted to selectively allow said first fluid and said second fluid to be applied to said pressure responsive element.

14. A method as claimed in claim 13, wherein said engine has an intake passage, said first fluid from said first hydraulic pressure source being intake air in said intake passage as intake passage pressure, and said second fluid from said second pressure source being atmospheric air as atmospheric pressure.

15. A method as claimed in claim 13, wherein the detection of the actual flow rate value of said fluid of the step (3) is effected by detecting an amount of displacement of said pressure responsive element, said desired flow rate value being expressed in terms of a desired amount of displacement of said pressure responsive element.

16. A method as claimed in claim 13, wherein said control valve comprises a control valve for controlling at least one of the amount of intake air, the amount of fuel, and the amount of recirculated exhaust gases, which are being supplied to said engine.

* * * * *